J. W. OMAN.
AIRSHIP.
APPLICATION FILED JULY 12, 1909. RENEWED NOV. 12, 1910.

1,117,080.

Patented Nov. 10, 1914.
6 SHEETS—SHEET 3.

Witnesses

Inventor
J. W. Oman
by H. B. Willson & Co.
Attorneys

UNITED STATES PATENT OFFICE.

JOHN WILLIAM OMAN, OF HOUSTON, TEXAS, ASSIGNOR TO UNIVERSAL AERIAL NAVIGATION COMPANY, OF ST. LOUIS, MISSOURI, A CORPORATION OF ARIZONA.

AIRSHIP.

1,117,080.  Specification of Letters Patent.  Patented Nov. 10, 1914.

Application filed July 12, 1909, Serial No. 507,148. Renewed November 12, 1910. Serial No. 592,079.

*To all whom it may concern:*

Be it known that I, JOHN WILLIAM OMAN, a citizen of the United States, residing at Houston, in the county of Harris and State of Texas, have invented certain new and useful Improvements in Airships; and I do declare the following to be a full, clear, and exact description of the invention, such as will enable others skilled in the art to which it appertains to make and use the same.

This invention relates to improvements in airships.

The object of the invention is to provide an airship having an improved construction and arrangement of propellers and aeroplane and means whereby they may be readily controlled by the operator to change their positions to propel, raise, lower and steer the machine.

With the foregoing and other objects in view, the invention consists of certain novel features of construction, combination and arrangement of parts, as will be more fully described and particularly pointed out in the appended claims.

In the accompanying drawings, Fig. 3 is a rear end view, with the aeroplane shown in vertical position to more clearly illustrate it; Fig. 8 is a vertical sectional view on the line 8—8 of Fig. 4.

Referring more particularly to the drawings, 1 denotes the car or body portion of the airship which is preferably in the form of a water tight inclosure and is boat-shaped or provided with a pointed forward end and a tapered rear end to reduce the resistance in passing through the air or water. The body portion 1 is preferably supported upon wheeled trucks 2 whereby the same may be propelled over the ground. In the upper part of the body portion is arranged windows 3 and over the top of the rear portion is preferably arranged an observation deck 4. In the center of the body portion 1 is arranged a gear supporting post 5, on the upper end of which is arranged a bearing 6, in which is revolubly mounted a horizontal transversely disposed power transmitting shaft 7 on which is loosely mounted drive pulleys 8. The pulleys 8 are operatively connected by belts or chains 9 to drive pulleys 10 mounted on the shafts 12 of suitable motors 13 arranged in the body portion 1, as shown.

The pulleys 8 are engaged with the shaft 7 to operate the same by a pawl and ratchet connection as shown at 8ᵃ whereby the operation of one motor will not interfere with the other if running at a different speed or if stopped altogether. Should one motor be running at a slower speed than the other or not running at all, the pawls of the ratchet wheel on the pulley driven by the slow speed or idle motor will play loosely over the teeth of the ratchet on the shaft, as will be readily understood.

On the shaft 7, adjacent to each side of the supporting post 5 are mounted bevel gears as 14 and on the shaft between the gears 14 is loosely mounted a bearing yoke or frame 15, in which is revolubly mounted the inner end of a main propeller shaft 16 on which, adjacent to its inner end, is mounted a bevel gear pinion 17 which is in operative engagement with one of the gears 14 on the power transmitting shaft 7. On the outer end of the propeller shaft 16 is mounted a main elevating and driving propeller 18 by means of which the ship is raised and propelled. The shaft 16 and the propeller 18 are adapted to be raised and lowered to the proper angle for raising and propelling the ship by means of a raising and lowering mechanism comprising a chain or cable 19 which is passed around an operating pulley 20 and around suitably mounted guide pulleys 21 and has its opposite ends connected to a bearing block 22 which is slidably mounted in a segmental guide track 23 arranged on the forward end of the machine, as shown. The chain or cable operating pulley 20 is mounted on a suitable bearing bracket 24 and is provided with a crank handle 25 whereby the same is operated. The pulley is also provided with a suitable pawl and ratchet holding mechanism (not shown) whereby the same is locked to hold the propeller in its adjusted position.

Suitably secured to the upper end of the post 5 or to the bearing 6 formed thereon is a plane supporting post 26, on the upper end of which is pivotally mounted a transverse horizontally disposed plane supporting shaft 27 on which is secured an aeroplane 28. The plane 28 is suitably braced by truss rods 29 arranged on the underside of the same. The post 26 is braced at its upper end by the upper end of the segmental track 23 which is secured thereto, as shown. The aeroplane 28 is adapted to be tilted to various angles for raising, lowering or supporting the ship by means of operating chains or cables 30 which are connected at their opposite ends to the underside of the plane adjacent to the side edges thereof and pass around pulleys 31 on an operating shaft 32, suitably mounted on the plane supporting post 26. On the shaft 32 is also mounted a gear or pulley 33 which is connected by a chain or cable 34 to an operating gear or pulley 35 which is mounted in a suitable bearing bracket 36 arranged in the body of the ship. The gear 35 is provided with a crank handle 36 and with a suitable pawl and ratchet holding mechanism by means of which the plane is secured in its adjusted position. The plane 28 may be of any suitable shape and construction and is here shown as having a tapered rear portion and forwardly projecting blades 37.

The shaft 7 is supported and braced at its outer ends by suitable brace rods 38 which are secured to the sides of the body portion, as shown. On the outer ends of the shaft 7 are fixedly mounted bevel gears 39 and on said ends of the shaft, adjacent to the gears 39 are also loosely mounted bearing yokes 40 in which are revolubly mounted the inner ends of side propeller shafts 41 on the outer ends of which are mounted side propellers 42. On said shafts 41 are fixedly mounted bevel gear pinions 44 which are in operative engagement with the bevel gears 39 on the shafts 7 whereby said propellers are driven.

The propellers 42 are adapted to be raised or lowered or swung around the shaft 7 to any desired angle by means of operating rods 45 which are revolubly mounted in suitable bearings in the upper sides of the body 1 and in the braces 38 of the shafts 7. The rods 45 have fixedly mounted on their outer ends pulleys 46 around which are passed chains or belts 47 which also pass around guide pulleys 46ª mounted on suitable bearings on segmental guide tracks 47ª arranged on and supported by the brace rods 38 and 38ª at each end of the shaft 7. The ends of the chains or belts 47 are connected to the opposite ends of bearing blocks 43 slidably mounted in the segmental guide tracks 47ª through which the shafts 41 of the side propellers pass and are revolubly and adjustably supported. When the bearing blocks 45 are moved in one direction or the other by the chains or belts 47, the propellers may be raised or lowered to the desired position.

On the inner ends of the rods 45 are mounted gears or pulleys 48 which are connected by chains or belts 49 to gears or pulleys 50, suitably mounted on the inner sides of the body portion 1. The gears or pulleys 50 are provided with operating crank handles 51 and with pawl and ratchet holding devices whereby the propellers 42 are held in their adjusted position.

Arranged at the rear end of the ship is a steering propeller 52, said propeller being fixedly mounted on the end of a short operating shaft 53 connected at its inner end by a universal joint connection 54 to a drive shaft 55 mounted in suitable bearings in the body of the ship. This shaft 55 within the body of the car is formed in two sections on the adjacent ends of which are arranged cone friction pulleys 55ª between which is arranged an adjustable contact belt 55ᵇ, on which is secured a guide loop 55ᶜ with which is engaged a pivoted shifting lever 55ᵈ by means of which the belt is shifted to one end or the other of the cones whereby the outer section of the shaft 55 may be driven at a greater or less speed by the inner section of the shaft as will be readily understood, thus controlling or regulating the speed of the steering propeller. The inner shaft section is provided on its inner end with a bevel gear 56 which is in engagement with one of the gear wheels 14 on the power transmitting shaft 7 whereby motion is imparted to said shafts 55 and 53 which are operated to revolve the propeller 52 in one direction or the other, according to the gear 14 with which the gear 56 is in mesh.

The shaft 53 is mounted in a suitable bearing 53ª which is loosely engaged with or slidably mounted in a supporting frame 57 comprising upper and lower segmental plates supported on suitable braces 58 on the rear end of the body portion 1, as shown. Between the plates of the segmental frame 57 and connected to the bearing 53ª is a segmental rack 59, which is engaged by a gear pinion 60 on the outer end of an operating rod 61 which projects into the body portion of the car, below the shaft 55 and is mounted in suitable bearing brackets 62 and has on its inner end a gear or pulley 63 which is connected by a chain or belt 64 to a gear or pulley 65 mounted in suitable bearing brackets 66 on the gear supporting post 5. The gear or pulley 65 is provided with an operating crank handle 67 and with a pawl and ratchet mechanism for holding the propeller in its adjusted position.

On the upper side of the plane 28, adjacent to its front and rear corners are arranged suitable parachutes 68 which are provided with means for moving the same into operative and inoperative positions to facilitate the lowering of the ship. The parachutes 68 are also employed in case of accidents to the machinery or propelling mechanism to permit the ship to gradually lower.

The parachutes 68 are in the form of umbrellas, the ribs of which are braced by cords 68a and the staffs or rods 69 of the same are pivotally connected to the top of the plane whereby the parachutes may swing upwardly to an operative position. When not in use the parachutes are closed or folded and swung down into engagement with the top of the plane 28 and are held in this position by clamping rings 70 formed in hingedly connected sections which are secured in operative engagement with the parachutes by a suitable spring catch 71. To the spring catches 71 of the clamping rings 70 of each of the parachutes is connected an operating cord 72, said cords extending across the top of the plane 28, to an opening 73 formed therein over the center of the car 1.

The cords 72 pass through the opening 73 and extend down into the car 1 and are connected to an operating lever 74 arranged therein and held in position by a spring clip 75. When the catches are released by the lever 74 and cords 72, the upper portion of the clamping rings will be unlocked and the parachutes permitted to swing up to an operative position.

The parachutes when released are swung upwardly by curved coiled springs 76 which are operatively engaged therewith and with the top of the plane. When the parachutes are thus swung upwardly, they will automatically open to an operative position by means of coiled springs 77 arranged in the handles thereof. By means of the releasing mechanism just described, the parachutes will all swing upwardly and open at once or in unison.

Secured to the underside of the body portion 1 is a balancing ball or weight 78. The weight 78 is connected to the bottom of the ship by a supporting chain 79 and is held in operative position by brace chains 80.

While the ship is here shown as being provided with side propellers, the latter may be dispensed with on ships constructed for light work. If desired, the wheels of the supporting trucks 2 may be connected to the drive shafts of the motors by suitable operating mechanism (not shown), whereby the ship may be propelled over the ground. Owing to the water tight construction of the body portion 1, the ship will float and may be propelled in the water, from which it may be caused to rise by a suitable manipulation of the propellers and aeroplane.

Figure 1:
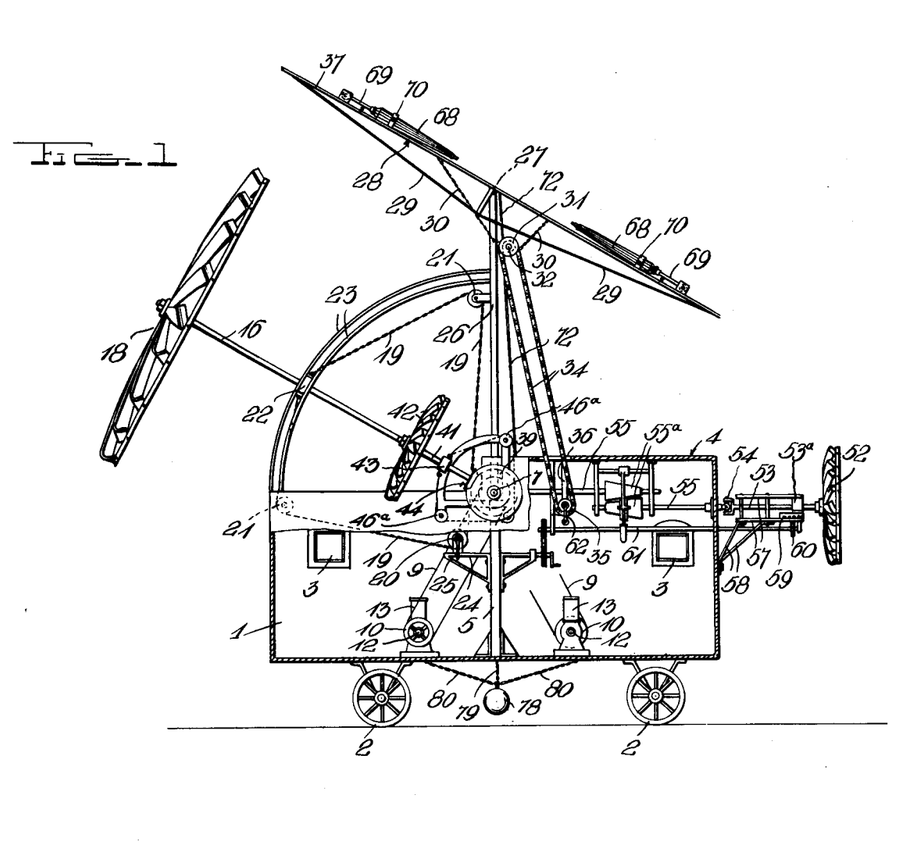
Figure 1 is a side elevation, showing the aeroplane and propellers arranged at the proper angle for elevating the airship partly in longitudinal section.
Figure 2:
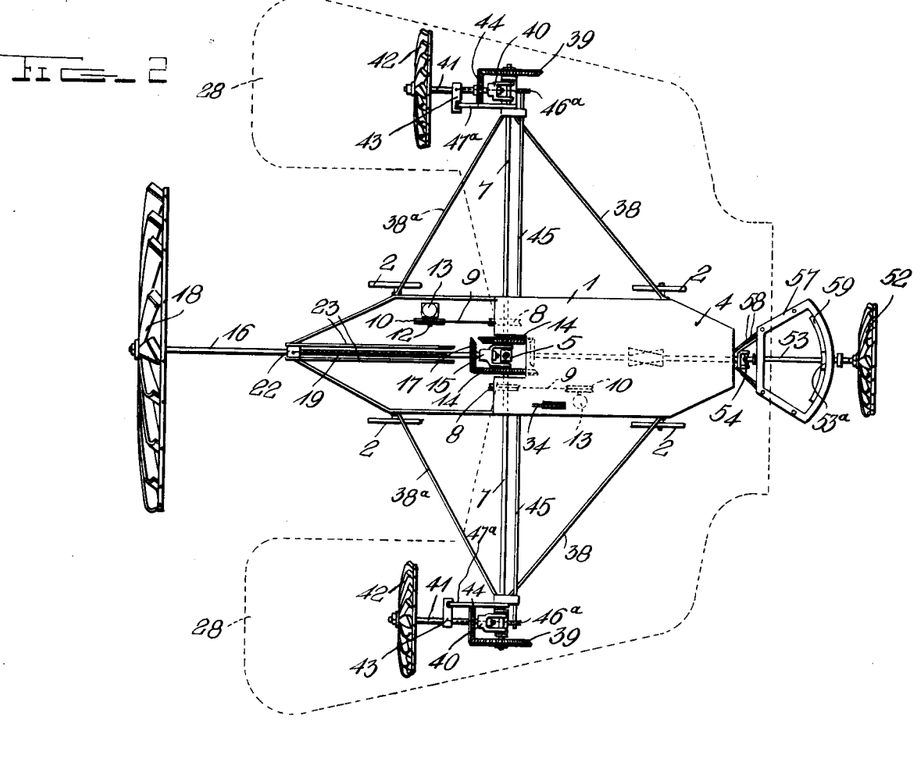
Fig. 2 is a plan view of the same with the aeroplane shown in dotted outline.
Figure 4:
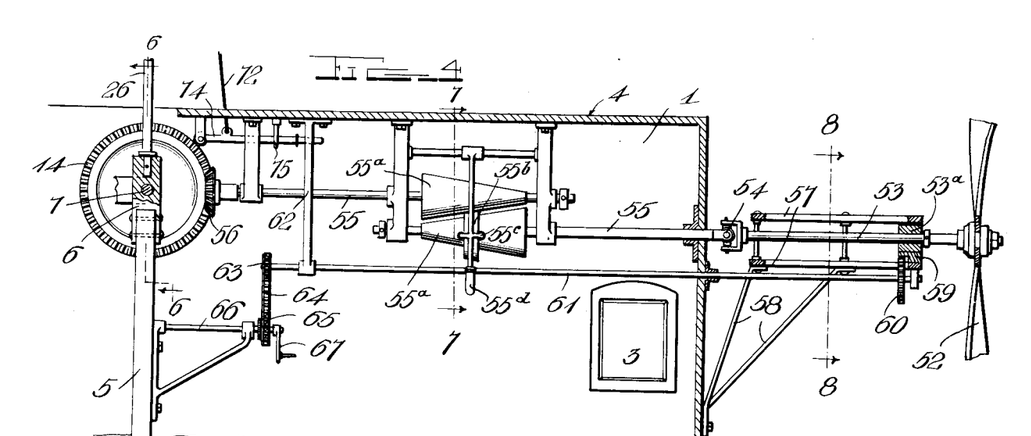
Fig. 4 is a fragmentary longitudinal sectional view of the car on an enlarged scale disclosing more particularly the arrangement of the driving mechanism for the front and rear propellers.
Figure 5:
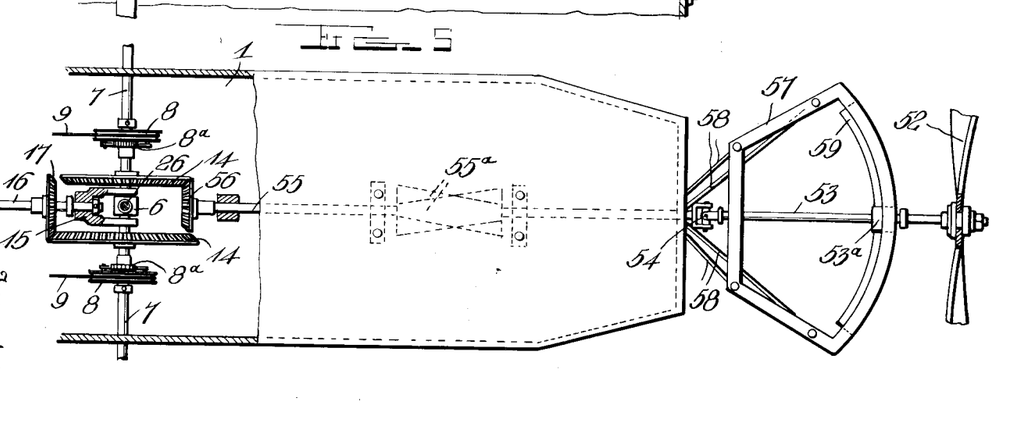
Fig. 5 is a plan view of the same, with parts broken away.
Figure 6:
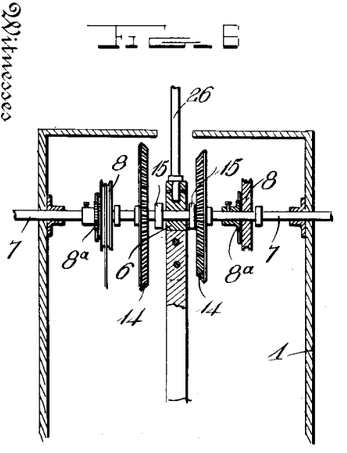
Fig. 6 is a detail vertical sectional view on line 6—6 of Fig. 4.
Figure 7:
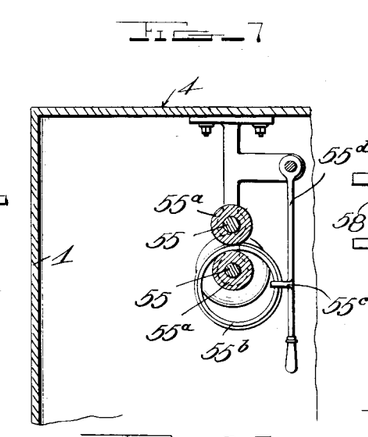
Fig. 7 is a detail vertical sectional view on the line 7—7 of Fig. 4.
Figure 9:
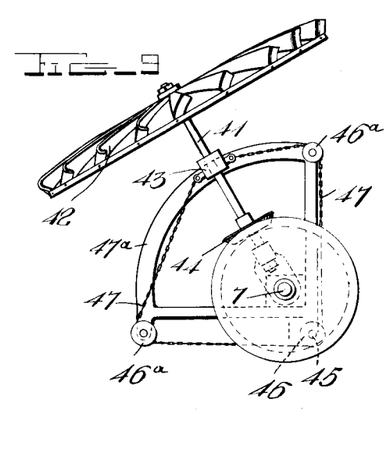
Fig. 9 is a side elevation of a portion of the machine showing more particularly the means for adjusting the side propellers.
Figure 10:
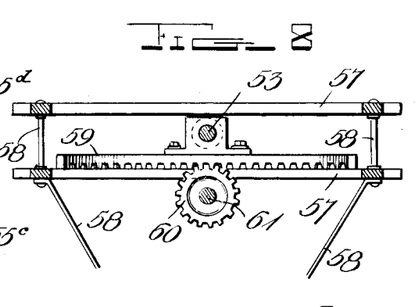
Fig. 10 is an end view of the parts shown in Fig. 9.
Figures 11, 15:
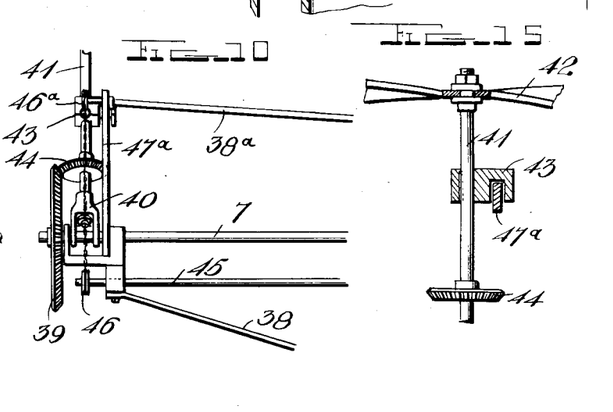
Fig. 11 is a plan view of a portion of the aeroplane showing the arrangement of the parachutes.
Fig. 15 is a detail view of a portion of one of the side propellers showing the sliding engagement thereof with its guide track.
Figure 11:
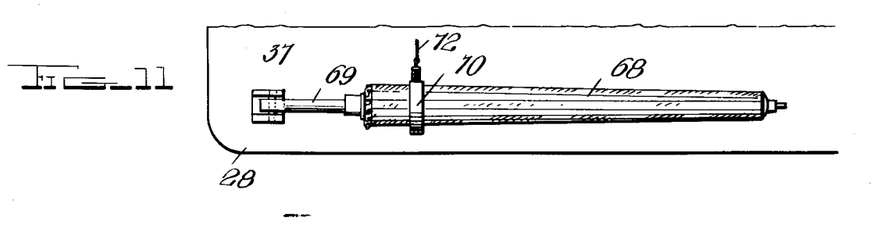
Figures 12, 13, 14:
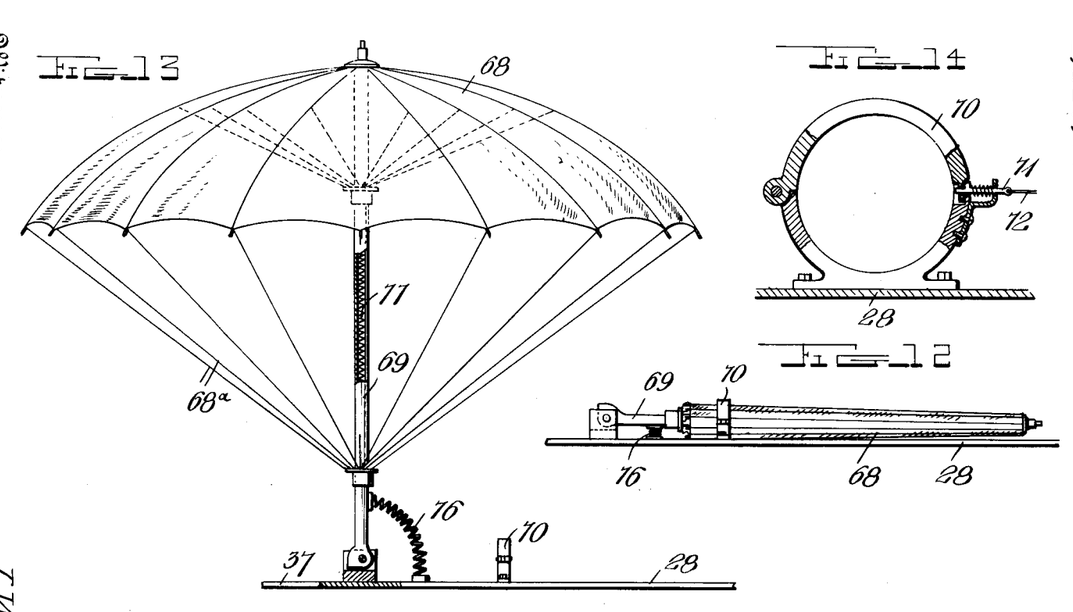
Fig. 12 is a side elevation of the parts shown in Fig. 11.
Fig. 13 is a similar view, partly in section, showing the parachutes when in open position.
Fig. 14 is a detail view of the spring catch for releasing the parachutes.

In the operation, to raise the ship, the propellers and aeroplane are adjusted to the position shown in Fig. 1 of the drawings in which position the propellers and plane remain until the machine has reached the desired elevation, at which time, the operator changes the angle of the elevating propeller 18 to the proper angle for drawing the machine through the air. As the speed of the ship increases, the angle of the aeroplane is changed to maintain the flight on a level and as greater speed is reached, the propellers are all lowered gradually until they operate on a level with the car or body portion of the ship. When the propellers are in the last mentioned position, the entire weight of the machine is suspended from the aeroplane. When the operator desires to alight on the ground or in water, the speed of the propellers is reduced and as the speed decreases, the angle of the propellers and the aeroplane is changed. The movement of the propellers is gradually decreased or reduced until the machine is brought to the ground or water.

From the foregoing description, taken in connection with the accompanying drawings, the construction and operation of the invention will be readily understood without requiring a more extended explanation.

Various changes in the proportion, form and minor details of construction may be resorted to without departing from the principle or sacrificing any of the advantages of the invention, as defined in the appended claims.

Having thus described my invention, what I claim is:

1. In an airship, a water tight body portion or car, a propelling mechanism arranged therein, a main driving and elevating propeller operatively connected with said mechanism, a segmental guide track, a bearing slidably mounted in said track to receive the shaft of said propeller, a raising and lowering cable connected with said bearing, means to operate said cable whereby said propeller is raised and lowered to the desired angle, an aeroplane operatively mounted above said car or body portion, plane operating cables connected thereto whereby the angle of the plane is varied, a steering propeller adjustably mounted on the rear end of the car, means to adjust said propeller to different angles, and means whereby the propeller is operated when at different angles.

2. In an air ship, a water tight body portion or car, wheeled supporting trucks arranged beneath the car, a balancing weight connected to the underside of the latter, a gear supporting post arranged in the car, a power transmitting shaft revolubly mounted on the upper end of said post, operating motors arranged in the car, means to connect said power transmitting shafts with the motors, driving gears fixedly mounted on said shafts, a bearing yoke loosely mounted on the shafts, a main propelling and elevating shaft mounted at its inner end in said yoke and operatively connected to said driving gears, a segmental guide track, a bearing slidably mounted in said track to receive said main shaft, a propeller on the outer end of said shaft, means to raise and lower said shaft and propeller, an aeroplane suitably mounted above said car, and a steering propeller, operatively mounted on the rear end thereof.

3. In an air ship, a car, a gear supporting post arranged therein, a power transmittig shaft mounted on the upper end of said post, driving gears mounted on said shaft, an adjustably mounted main elevating and propelling shaft, operatively connected with said gears, means to adjust said shaft, a propeller mounted on the outer end of the shaft, side propellers loosely mounted on the outer ends of said power transmitting shaft, means to adjust said side propellers at different angles of operation, means to operatively gear said propellers to said power transmitting shaft, a steering propeller operatively mounted on the rear end of the car, means to adjust said propeller to different angles, means to operatively connect the same with the driving gears on said power transmitting shaft whereby said propeller is operated in its adjusted positions, and an aeroplane operatively mounted above the car.

4. In an air ship, a water tight wheeled car or body portion, an observation deck on the top of said car, a gear supporting post arranged in the car, a power transmitting shaft revolubly mounted on said post, motors connected with said shaft to drive the same, a plane supporting post arranged on the upper end of said gear supporting post, an aeroplane shaft pivotally mounted upon the upper end of said post, an aeroplane arranged on said shaft, means whereby said plane is tilted to various angles to raise and support the ship in the air, driving gears mounted on said power transmitting shaft, a main driving and elevating propeller adjustably mounted on the car and operatively connected with said driving gears, side propellers adjustably mounted on the outer end of said power transmitting shaft, means to operatively gear said side propellers to said shaft, and a steering propeller adjustably mounted at the rear end of the car.

5. In an airship, a car, a gear supporting post, a power transmitting shaft revolubly mounted on said post, motors arranged in the car and operatively connected to said shaft, driving gears mounted on said shaft, a main driving and elevating propeller operatively connected to said gears, an aeroplane adjustably mounted above the car, a guide frame arranged on the rear end of the car, a segmental bearing rack mounted in said guide frame, a shaft revolubly mounted in said bearing rack, a steering propeller mounted on the rear end of said shaft, a drive shaft operatively engaged with the driving gears on said power transmitting shaft, a universal joint connection between said rear propeller shaft and said drive shaft whereby said propeller is operated at different angles, a propeller adjusting shaft, a gear on the outer end of said shaft to engage the teeth of said bearing rack, and means in said car whereby said shaft is turned in one direction or the other, thereby turning said bearing rack and the steering propeller to the desired angle.

6. In an air ship, a car, a power transmitting shaft mounted therein, drive pulleys loosely mounted on said shaft, a clutch connection between said pulleys and said shaft whereby the latter may turn independently of the pulleys, independently operating motors connected to said drive pulleys, a main driving and elevating propeller operatively geared to said shaft, means to raise and lower said propeller, a steering propeller also operatively geared to said shaft, and means to adjust said steering propeller to different angles of operation.

7. In an air ship, a car, a power transmitting shaft operatively mounted therein, bearing yokes pivotally mounted on said shaft, a driving and elevating propeller shaft, and side propeller shafts pivotally mounted at their inner ends in said yokes, and geared to said shaft, propellers on said shafts, segmental guide frames, bearing blocks slidably mounted in said guide frames and adapted to receive and adjustably support said propeller shafts, guide pulleys on said guide frames, adjusting belts connected to said bearing blocks, and means to operate said belts to raise and lower said guide blocks in said frames and thereby adjust said propellers.

8. In an air ship, a car, a main drive shaft operatively mounted therein, a driving and elevating propeller, geared to said shaft, a supporting frame arranged on the rear end of said car, said frame comprising upper and lower segmental guide plates, a bearing block slidably mounted between said plates, a segmental rack secured to said bearing, a propeller shaft mounted in said bearing block, a steering propeller on said shaft, a propeller driving shaft mounted in said car and geared to said main drive shaft, said propeller driving shaft being formed in sections, cone friction pulleys on the adjacent ends of said shaft sections, an adjustable friction belt between said pulleys, means to shift said belt and thereby control the speed of the outer section of said shaft, a universal joint connection between said drive shaft and said propeller shaft, and means to turn said propeller shaft and propeller to different angles in said supporting frame.

9. In an air ship, a car, a main drive shaft operatively mounted therein, a driving and elevating propeller, geared to said shaft, a supporting frame arranged on the rear end of said car, said frame comprising upper and lower segmental guide plates, a bearing block slidably mounted between said plates, a segmental rack secured to said bearing, a propeller shaft mounted in said bearing block, a steering propeller on said shaft, a propeller driving shaft mounted in said car and geared to said main drive shaft, a universal joint connection between said propeller shaft and driving shaft, an adjusting rod mounted in said car and projecting beyond the rear of the same, a gear on the outer end of said rod adapted to engage the segmental rack on said bearing block whereby the latter and said propeller shaft is adjusted to different angles, and means in said car to operate said adjusting rod.

10. In an airship, a car, propeller mechanism, a shaft arranged to drive said propeller mechanism, a motor for operating said shaft and said propeller effectively to elevate and propel said car, a segmental guide, a bearing for the shaft of said propeller mounted in said guide, connections for raising or lowering said bearing, a crank for operating said connections whereby said propeller may be raised or lowered, a latch arranged to hold said propeller in any desired adjustment, an aeroplane arranged above said car, connections for varying the angle of said plane, a steering propeller driven by the said shaft which drives the first-named propeller, means for adjusting said steering propeller in different positions, and means for operating said propeller in any of said positions, substantially as specified.

11. In an airship, propeller mechanism, a shaft for driving said propeller mechanism, a motor for operating said shaft and said propeller to elevate and propel the airship, a guide, a bearing for the shaft of said propeller mounted in said guide, connections for raising and lowering said bearing in said guide, a crank for operating said connections and thereby said guide to raise and lower said propeller, a latch device for holding the propeller in any desired adjustment, an aeroplane supported above the airship, connections for varying the angle of said plane, a steering propeller driven by said shaft which drives the first-named propeller, means for adjusting said steering propeller in different positions, and means for driving said steering propeller by said shaft in any of said positions, substantially as described.

12. In an airship, a car, a propeller arranged in connection with said car, another propeller operable to elevate said car and to propel said car horizontally, an aeroplane above said car, mechanism for adjusting said plane in different positions whereby the altitude of the car will be varied when said propeller is operated to propel said car horizontally, independent means for raising and lowering said last-named propeller, a latch device for holding said last-named propeller in any desired adjustment, and means for operating said propeller in any of its said adjustments, substantially as described.

In testimony whereof I have hereunto set my hand in presence of two subscribing witnesses.

JOHN WILLIAM OMAN.

Witnesses:
Joe McClellan, Jr.,
E. Sandoval.